US008266488B2

(12) United States Patent
Spencer

(10) Patent No.: US 8,266,488 B2
(45) Date of Patent: Sep. 11, 2012

(54) ENCODING AND DECODING SYSTEMS WITH HEADER AND DATA TRANSMISSION SUCCESS INDICATION

(75) Inventor: Paul S. Spencer, Modiin (IL)

(73) Assignee: Marvell Israel (MIL) Ltd., Yokneam (IL)

( * ) Notice: Subject to any disclaimer, the term of this patent is extended or adjusted under 35 U.S.C. 154(b) by 1204 days.

(21) Appl. No.: 12/056,089

(22) Filed: Mar. 26, 2008

(65) Prior Publication Data

US 2008/0242236 A1 Oct. 2, 2008

Related U.S. Application Data

(60) Provisional application No. 60/908,031, filed on Mar. 26, 2007.

(51) Int. Cl.
*G06F 11/00* (2006.01)
(52) U.S. Cl. ........................................................ 714/748
(58) Field of Classification Search .................. 714/748; 455/73
See application file for complete search history.

(56) References Cited

U.S. PATENT DOCUMENTS

| | | | |
|---|---|---|---|
| 5,287,463 A * | 2/1994 | Frame et al. | 710/105 |
| 5,802,115 A | 9/1998 | Meyer | |
| 6,496,798 B1 * | 12/2002 | Huang et al. | 704/230 |
| 6,580,713 B1 * | 6/2003 | Abe | 370/394 |
| 6,690,719 B1 * | 2/2004 | Raphaeli et al. | 375/222 |
| 6,925,592 B2 | 8/2005 | Inoue et al. | |
| 7,000,173 B2 | 2/2006 | Buckley et al. | |
| 7,616,636 B2 * | 11/2009 | Ben Rached et al. | 370/392 |
| 2002/0071407 A1 * | 6/2002 | Koo et al. | 370/335 |
| 2003/0185181 A1 * | 10/2003 | Balachandran et al. | 370/337 |
| 2004/0179517 A1 * | 9/2004 | Yamamoto et al. | 370/356 |
| 2005/0123047 A1 * | 6/2005 | Alvarez Arevalo et al. | 375/240.16 |
| 2005/0147112 A1 * | 7/2005 | Sugaya | 370/418 |
| 2007/0234186 A1 * | 10/2007 | Mo et al. | 714/790 |
| 2007/0297533 A1 | 12/2007 | Chitrapu et al. | |
| 2009/0238208 A1 * | 9/2009 | Naka | 370/470 |

FOREIGN PATENT DOCUMENTS

EP  1548989  6/2005

OTHER PUBLICATIONS

International Search Report dated Oct. 28, 2008 from PCTIB2008/000711 and Written Opinion (12 pgs.).
3GPP TSG-GERAN2 #29bis; Sophia Antipolis, France, May 22-24, 2006; Source: Siemens; Tdoc G2-060203; RTTI and Fast Ack/Nack reporting; 6 pages.
3GPP TSG-GERAN #30; Lisbon, Portugal, Jun. 26-30, 2006; Source: Siemens; Tdoc GP-061225; RTTI and Fast Ack/Nack reporting; 6 pages.
3GPP TSP-GERAN WG #35; Dublin, Ireland, Aug. 27-31, 2007; Source: Nokia Siemens Networks, Nokia Corporation; Tdoc GP-071284; VoIP over GERAN and FANR in the DL; 6 pages.

(Continued)

*Primary Examiner* — Scott Baderman
*Assistant Examiner* — Yair Leibovich

(57) ABSTRACT

A transceiver includes a receiver that receives and demodulates a first encoded block of data. The first encoded block of data includes a first redundancy version that corresponds to a first payload portion and a first header portion. The first encoded block of data is received from a communication device that is remote from the transceiver and that is in a cellular telecommunication network. A transmitter transmits an acknowledgement/negative acknowledgement (ACK/NACK) signal that includes a dedicated decoding status indicator for the header portion.

53 Claims, 6 Drawing Sheets

OTHER PUBLICATIONS

3GPP TS 44.060 V8.0.0 (Mar. 2008); 3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 8); 545 pages.

3GPP TS 43.064 V7.8.0 (Feb. 2008); 3rd Generation Partnership Project; Technical Specification Group GSM/EDGE Radio Access Network; General Packet Radio Service (GPRS); Overall description of the GPRS radio interface; Stage 2 (Release 7); 103 pages.

3GPP TS 25.212 V8.1.0 (Mar. 2008); 3rd Generation Partnership Project; Technical Specification Group Radio Access Network; Multiplexing and channel coding (FDD) (Release 8); 103 pages.

3GPP TS 45.003 V7.4.0 (Feb. 2008); 3rd Generation Partnership Project; Technical Specification Group GSM/EDGE Radio Access Network; Channel coding (Release 7); 317 pages.

* cited by examiner

ENCODING AND DECODING SYSTEMS WITH HEADER AND DATA TRANSMISSION SUCCESS INDICATION

CROSS-REFERENCE TO RELATED APPLICATIONS

This application claims the benefit of U.S. Provisional Application No. 60/908,031, filed on Mar. 26, 2007. The disclosure of the above application is incorporated herein by reference in its entirety.

FIELD

The present disclosure relates to communication systems, and more particularly to header dependent encoding and decoding systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some cellular telecommunication protocols, a block of data may include a header and a payload, which are separately encoded. The header provides information with respect to the format of the payload. The header and a first redundancy version of the payload is transmitted from a transmitter to a receiver. During good signal conditions, the header is decoded by the receiver, followed by decoding of the payload.

Under certain conditions, the header is decoded correctly, but the payload is decoded incorrectly. An automatic repetition request (ARQ) mechanism of the receiver generates an acknowledgement/negative acknowledgement (ACK/NACK) reply based on successful decoding of the payload. The ACK/NACK reply is transmitted from the receiver to the transmitter. The transmitter may then transmit other redundancy version(s) of the payload. The receiver may then properly decode the payload based on the redundancy version(s).

SUMMARY

In one embodiment, a transceiver is provided that includes a receiver that receives and demodulates a first encoded block of data. The first encoded block of data includes a first redundancy version that corresponds to a first payload portion and a first header portion. The first encoded block of data is received from a communication device that is remote from the transceiver and that is in a cellular telecommunication network. A transmitter transmits an acknowledgement/negative acknowledgement (ACK/NACK) signal that includes a dedicated decoding status indicator for the header portion.

In other features, the second header portion is different than the first header portion. In other features, the receiver is configured to receive and demodulate the first encoded block of data when encoded based on at least one of convolutional encoding, turbo encoding, and low-density parity-check encoding.

In other features, the transceiver includes a control module that controls reception and demodulation of a second encoded block of data that includes a second header portion and a second redundancy version corresponding to the first payload portion via the receiver. The second redundancy version is generated at least partially based on the ACK/NACK signal.

In other features, the ACK/NACK signal includes a decoding status indicator of the first payload portion. The control module controls reception and demodulation of the second encoded block of data. The second encoded block of data is generated at least partially based on decoding status of the first payload portion and the header portion.

In other features, the second redundancy version includes the same bits as the first redundancy version. In other features, the second redundancy version includes different bits than the first redundancy version.

In other features, the receiver is configured to demodulate the first payload portion using bits of the first redundancy version and additional bits of the second redundancy version that are selected based on the ACK/NACK signal.

In other features, the first redundancy version includes systematic bits and the second redundancy version includes parity bits. In other features, the first redundancy version does not include parity bits and the second redundancy version does not include systematic bits. In other features, the first redundancy version and the second redundancy version may contain a combination of systematic bits and parity bits.

In other features, a mobile station is provided that includes the transceiver. In other features, a base station is provided that includes the transceiver. In other features, a network is provided that includes the transceiver and communication device.

In other features, a transceiver is provided that includes a transmitter that modulates and transmits an encoded first block of data to a communication device that is remote from the transceiver and in a cellular telecommunication network. The encoded block of data includes a first redundancy version that corresponds to a first payload portion and a first header portion. A receiver receives an ACK/NACK signal that includes a dedicated decoding status indicator of the header portion by the communication device.

In other features, the transceiver includes a control module that controls modulation and transmission of an encoded second block of data that includes a second header portion and a second redundancy version corresponding to the first payload portion via the transmitter. The second redundancy version is generated at least partially based on the ACK/NACK signal.

In other features, the second header portion is different than the first header portion. In other features, the ACK/NACK signal includes a decoding status indicator of the first payload portion. The encoded second block of data is at least partially based on decoding status of the first payload portion and the header portion.

In other features, the transmitter is configured to modulate and transmit the second redundancy version. The second redundancy version includes the same bits as the first redundancy version. In other features, the transmitter is configured to modulate and transmit the second redundancy version. The second redundancy version includes different bits than the first redundancy version.

In other features, the transmitter is configured to modulate and transmit the second redundancy version. Bits of the second redundancy version are selected based on at least one of convolutional encoding, turbo encoding, and low-density parity-check encoding.

In other features, the transmitter is configured to modulate and transmit the first redundancy version, which includes systematic bits and the second redundancy version include parity bits. In other features, the transmitter modulates and transmits the first redundancy version, which does not include parity bits and the second redundancy version does not include systematic bits. In other features the transmitter modulates and transmits redundancy versions that include both systematic bits and parity bits.

In other features, the transmitter modulates and transmits the first encoded block of data that is encoded based on at least one of convolutional encoding, turbo encoding, and low-density parity-check encoding. In other features, a mobile station is provided that includes the transceiver. In other features, a base station is provided that includes the transceiver. In other features, a network is provided that includes the transceiver and communication device.

In other features, a transceiver is provided that includes a demodulator that generates a demodulated signal based on an encoded block of data that is received from a communication device that is remote from the transceiver and in a cellular telecommunication network. The encoded block of data includes a header portion and a payload portion. A decoder generates a decoded signal based on the demodulated signal. A control module controls generation and transmission of a header status signal to the communication device at least partially based on decoding of the header portion. The header status signal includes a dedicated decoding status indicator of the header portion.

In other features, the control module controls reception of a redundancy version corresponding to the payload portion from the communication device. The redundancy version is generated at the remote device at least partially based on the header status signal.

In other features, the control module controls generation and transmission of a payload status signal based on whether the payload portion is decoded by the decoder. In other features, the control module controls generation and transmission of an acknowledgement signal that includes the header status signal and the payload status signal to the communication device.

In other features, the control module controls generation and transmission of the acknowledgement signal including a concatenation of a header bit map and a payload bit map. In other features, the control module controls generation of a bit map that indicates decoding status for each of payload blocks. The control module controls generation of the acknowledgement signal based on the header status signal and the bit map.

In other features, the control module controls generation of a header bit map that indicates decoding status for each header of blocks of data. The control module controls generation of a payload bit map that indicates decoding status for each payload of the blocks of data. The control module controls generation of the header status signal and a payload status signal based respectively on the header bit map and the payload bit map.

In other features, the control module compresses the header bit map based on the payload bit map. In other features, a first number of bits in the header bit map is equal to a second number of bits in the payload bit map that represent a non-decoded payload block.

In other features, the control module controls generation and transmission of the acknowledgement signal including a concatenation of the header bit map and the payload bit map. In other features, the demodulator generates the demodulated signal based on the encoded block of data, which includes at least one of turbo-encoded data, convolutional encoded data, and low-density parity-check encoded data.

In other features, a communication system is provided that includes the transceiver and further includes the communication device, the communication device generates at least one of a header and a redundancy version corresponding to the payload portion based on the header status signal.

In other features, a transceiver is provided and includes an encoder that generates an encoded signal based on a block of data that includes a payload portion and a first header portion. A modulator generates a modulated signal based on the encoded signal. A transmitter transmits the modulated signal to a network communication device that is remote from the transceiver and in a cellular telecommunications network. A control module controls reception of a header status signal, which includes a dedicated decoding status indicator of the first header portion, from the network communication device at least partially based on the modulated signal.

In other features, the header status signal is generated based on whether the first header portion is decoded by the network communication device. In other features, the control module controls transmission of a second encoded header portion that is different than the first encoded header portion based on the header status signal. The control module controls transmission of a redundancy version of the payload portion to the network communication device based on the header status signal.

In other features, the control module controls reception and processing of a payload status signal that indicates decoding status of the payload by the network communication device. The control module controls transmission of a redundancy version of the payload portion to the network communication device based on the payload status signal and the header status signal.

In other features, the control module controls reception of an acknowledgement signal that includes the header status signal and the payload status signal to the network communication device. In other features, the acknowledgement signal includes a concatenation of a header bit map and a payload bit map.

In other features, the header status signal is generated by the network communication device based on a bit map. The bit map indicates decoding status for each of blocks of data that are transmitted from the transceiver to the network communication device.

In other features, the header status signal and a payload status signal are generated by the network communication device based respectively on a header bit map and a payload bit map. The header bit map indicates decoding status for a header and blocks of data. The payload bit map indicates decoding status for each payload of the blocks of data. In other features, the header bit map is compressed based on the payload bit map.

In other features, each status bit of the header bit map is generated based on a corresponding payload status bit of the payload bit map. In other features, a first number of bits in the header bit map is equal to a second number of bits in the payload bit map that represent a non-decoded payload block.

In other features, the control module controls reception of an acknowledgement signal that includes the header bit map and the payload bit map from the network communication device. The control module controls generation and transmission of a redundancy version corresponding to the payload portion based on the acknowledgement signal.

In other features, the control module controls reception of the acknowledgement signal that includes a concatenation of the header bit map and the payload bit map. In other features, the encoded signal includes at least one of turbo-encoded data, convolutional encoded data, and low-density parity-check encoded data.

In other features, a communication system is provided that includes the transceiver and further includes the network communication device. The communication device receives at least one of a header and a redundancy version from the transceiver corresponding to the payload portion based on the header status signal.

In other features, a method of operating a transceiver is provided and includes receiving and demodulating a first encoded block of data that includes a first redundancy version corresponding to a first payload portion a first header portion. The first encoded block of data is received from a communication device that is remote from the transceiver and that is in a cellular telecommunication network. An ACK/NACK signal is transmitted that includes a dedicated decoding status indicator for the header portion.

In other features, the second header portion is different than the first header portion. In other features, the first encoded block of data is received and demodulated when encoded based on at least one of convolutional encoding, turbo encoding, and low-density parity-check encoding.

In other features, the method includes controlling reception and demodulation of a second encoded block of data that includes a second header portion and a second redundancy version corresponding to the first payload portion via the receiver. The second redundancy version is generated at least partially based on the ACK/NACK signal.

In other features, the ACK/NACK signal includes a decoding status indicator of the first payload portion. The second encoded block of data is generated at least partially based on decoding status of the first payload portion and the header portion.

In other features, the second redundancy version includes the same bits as the first redundancy version. In other features, the second redundancy version includes different bits than the first redundancy version.

In other features, the first payload portion is demodulated using bits of the first redundancy version and additional bits of the second redundancy version that are selected based on the ACK/NACK signal.

In other features, the first redundancy version includes systematic bits and the second redundancy version includes parity bits. In other features, the first redundancy version does not include parity bits and the second redundancy version does not include systematic bits. In other features, the first redundancy version and the second redundancy version may contain a combination of systematic bits and parity bits.

In other features, a method of operating a transceiver is provided and includes modulating and transmitting an encoded first block of data that includes a first redundancy version corresponding to a first payload portion and a first header portion to a communication device. The communication device is remote from the transceiver and is in a cellular telecommunication network. An ACK/NACK signal that includes a dedicated decoding status indicator of the header portion by the communication device is received.

In other features, the method includes modulating and transmitting an encoded second block of data that includes a second header portion and a second redundancy version corresponding to the first payload portion via the transmitter. The second redundancy version is generated at least partially based on the ACK/NACK signal.

In other features, the second header portion is different than the first header portion. In other features, the ACK/NACK signal includes a decoding status indicator of the first payload portion. The encoded second block of data is at least partially based on decoding status of the first payload portion and the header portion.

In other features, the second redundancy version includes the same bits as the first redundancy version. In other features, the second redundancy version includes different bits than the first redundancy version. In other features, bits of the second redundancy version are selected based on at least one of convolutional encoding, turbo encoding, and low-density parity-check encoding.

In other features, the first redundancy version includes systematic bits and the second redundancy version includes parity bits. In other features, the first redundancy version does not include parity bits and the second redundancy version does not include systematic bits. In other features, the first encoded block of data is encoded based on at least one of convolutional encoding, turbo encoding, and low-density parity-check encoding.

In other features, a method of operating a transceiver is provided and includes generating a demodulated signal based on an encoded block of data that includes a header portion and a payload portion. The encoded block of data is received from a communication device that is remote from the transceiver and in a cellular telecommunication network. A decoded signal is generated based on the demodulated signal. A header status signal is generated and transmitted that includes a dedicated decoding status indicator of the header portion to the communication device at least partially based on decoding of the header portion.

In other features, the method includes receiving a redundancy version corresponding to the payload portion from the communication device. The redundancy version is generated at the communication device at least partially based on the header status signal. In other features, the method further includes generating and transmitting a payload status signal based on whether the payload portion is decoded by the decoder.

In other features, the method further includes generating and transmitting an acknowledgement signal that includes the header status signal and the payload status signal to the communication device. In other features, the method further includes generating and transmitting the acknowledgement signal including a concatenation of a header bit map and a payload bit map.

In other features, the method further includes generating a bit map that indicates decoding status for each of payload blocks. The acknowledgement signal is generated based on the header status signal and the bit map.

In other features, the method further includes generating a header bit map that indicates decoding status for each header of blocks of data. A payload bit map is generated that indicates decoding status for each payload of the blocks of data. The header status signal and a payload status signal are generated based respectively on the header bit map and the payload bit map.

In other features, the method further includes compressing the header bit map based on the payload bit map. In other features, a first number of bits in the header bit map is equal to a second number of bits in the payload bit map that represent a non-decoded payload block.

In other features, the method further includes generating and transmitting the acknowledgement signal including a concatenation of the header bit map and the payload bit map. In other features, the demodulated signal is generated based on the encoded block of data, which includes at least one of turbo-encoded data, convolutional encoded data, and low-density parity-check encoded data.

In other features, the method includes generating at least one of a header and a redundancy version corresponding to the payload portion based on the header status signal via the communication device.

In other features, a method of operating a transceiver is provided and includes generating an encoded signal based on a block of data that includes a payload portion and a first header portion. A modulated signal based on the encoded signal is generated. The modulated signal is transmitted to a network communication device that is remote from the transceiver and in a cellular telecommunications network. Reception of a header status signal is controlled. The header status signal includes a dedicated decoding status indicator of the first header portion. The header status signal is from the network communication device and is at least partially based on the modulated signal.

In other features, the header status signal is generated based on whether the first header portion is decoded by the network communication device. In other features, the method includes transmitting a second encoded header portion that is different than the first encoded header portion. A redundancy version of the payload portion is transmitted to the network communication device based on the header status signal.

In other features, the method includes receiving a payload status signal that indicates decoding status of the payload by the network communication device. A redundancy version of the payload portion is transmitted to the network communication device based on the payload status signal and the header status signal.

In other features, an acknowledgement signal that includes the header status signal and the payload status signal is received from the network communication device. In other features, the acknowledgement signal includes a concatenation of a header bit map and a payload bit map.

In other features, the header status signal is generated by the network communication device based on a bit map that indicates decoding status for each of blocks of data that are transmitted from the transceiver to the network communication device.

In other features, the header status signal and a payload status signal are generated by the network communication device based respectively on a header bit map and a payload bit map. The header bit map indicates decoding status for a header and blocks of data, and the payload bit map indicates decoding status for each payload of the blocks of data.

In other features, the header bit map is compressed based on the payload bit map. In other features, each status bit of the header bit map is generated based on a corresponding payload status bit of the payload bit map. In other features, a first number of bits in the header bit map is equal to a second number of bits in the payload bit map that represent a non-decoded payload block.

In other features, the method includes receiving an acknowledgement signal that includes the header bit map and the payload bit map from the network communication device. A redundancy version is transmitted and received corresponding to the payload portion based on the acknowledgement signal.

In other features, the acknowledgement signal includes a concatenation of the header bit map and the payload bit map. In other features, the encoded signal includes at least one of turbo-encoded data, convolutional encoded data, and low-density parity-check encoded data.

In other features, the method includes receiving at least one of a header and a redundancy version from the transceiver corresponding to the payload portion based on the header status signal by the network communication device.

In other features, a communication system is provided that includes the transceiver and further includes the network communication device. The communication device receives at least one of a header and a redundancy version from the transceiver corresponding to the payload portion based on the header status signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
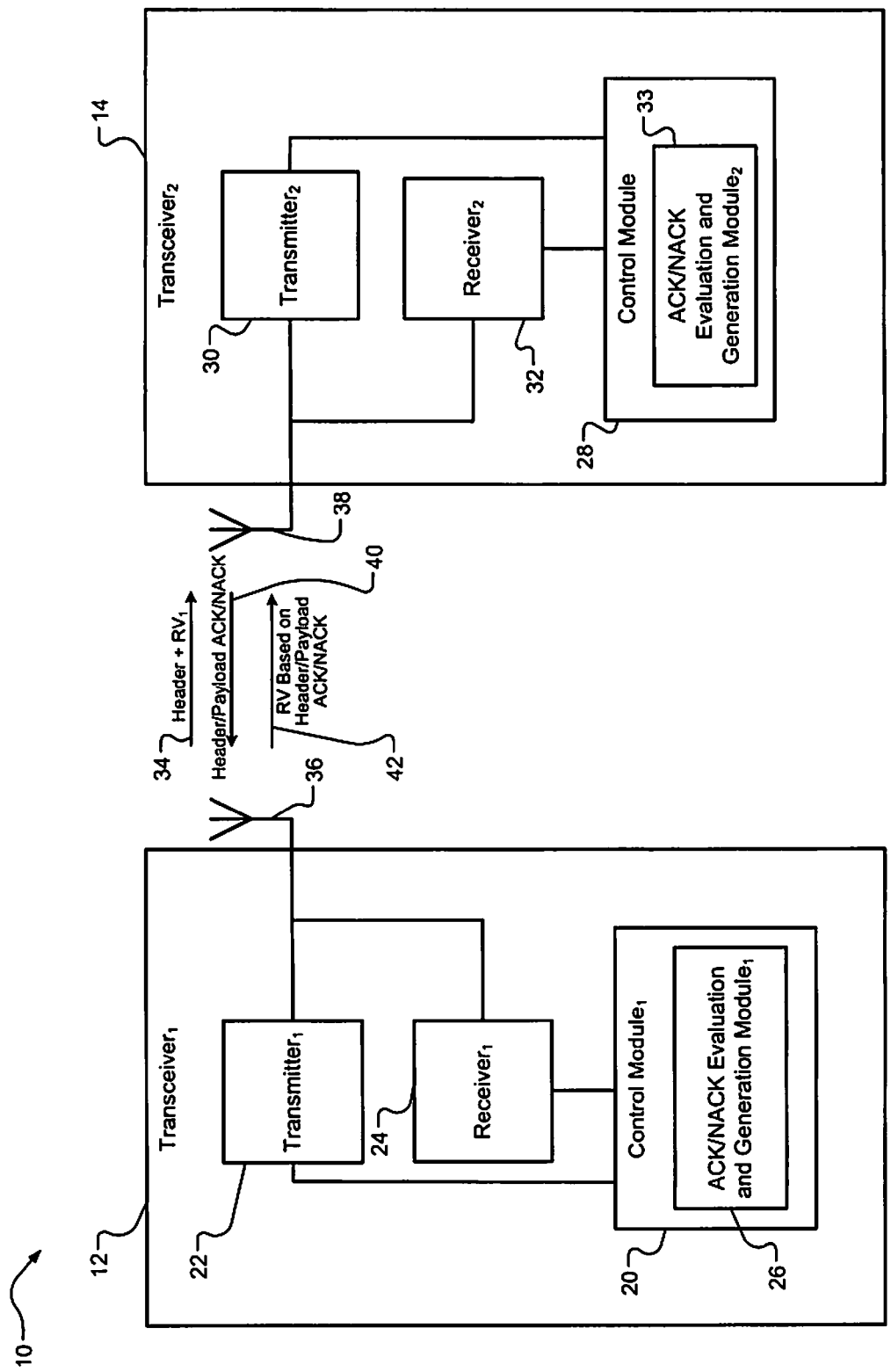
FIG. 1 is a functional block diagram of a mobile communication system in accordance with an embodiment of the present disclosure.

When the header of a transmitted radio block of data is decoded correctly and a corresponding payload is decoded incorrectly, partial information regarding the payload may be available to a receiver. The partial information is referred to as soft information, which may include bits or symbols of data. The soft information may also include a likelihood indication that transmitted information was properly received, that is to say a likelihood that an uncoded bit is a '1' or a '0'. An uncoded bit refers to bits generated by an encoder and transmitted to the receiver. Coded bits may refer to bits that are provided to the encoder that are used to generate the uncoded bits. The soft information may include, for example log likelihood ratios (LLRs), for each of the received uncoded bits.

The soft information may be stored with information obtained from the header and later used with subsequent transmissions, such as transmissions of other redundancy versions, to decode the same payload. This improves decoding performance. The soft information may be stored based on a block sequence number (BSN), which may identify a redundancy version corresponding to a payload block of a currently transmitted radio block of data. The BSN may be included in the header.

Different puncture sequences may be used when transmitting blocks of data with different redundancy versions corresponding to a payload. The overall amount of transmitted data increases with each transmitted redundancy version. After a given number of redundancy transmissions, a coding rate of a mother code is reached. When a header is decoded incorrectly, the number of transmissions and time to reach the mother code rate increases. When a header is initially decoded incorrectly, a receiver may not detect that a block of data has been transmitted. As a result, any received data may be discarded and no new soft information may be stored.

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The transceivers described herein may comply with $3^{rd}$ Generation Partnership Project (3GPP™) Technical Specification (TS) 43.064 "Overall description of the GPRS Radio Interface", 3GPP™ TS 25.212 "Multiplexing and Channel Coding", and 3GPP™ TS 44.060 "Radio Link Control/Medium Access Control (RLC)/(MAC) protocol", and 3GPP™ TS 45.003 "Channel Coding", which are incorporated herein by reference in their entirety. The transceivers disclosed herein may be used in association with providing global system for mobile communication (GSM)/enhanced data rates for global evolution (EDGE) radio access network (GERAN) packet switched services and/or communications. The transceivers described herein may be associated with the enhanced general packet radio service (EGPRS) and/or devices thereof. The transceivers may be used in performing downlink and uplink tasks including modulation and coding (MCS) schemes described in association with reduced symbol duration, higher order modulation and turbo coding (EGPRS2 Downlink) and higher uplink performance for GERAN evolution (EGPRS2 Uplink) work items.

Figure 5:
FIG. 5 is a diagram illustrating a radio block in accordance with an embodiment of the present disclosure.

Referring now to FIG. 1, a functional block diagram of a mobile communication system 10 in accordance with an embodiment of the present disclosure is shown. The mobile communication system 10 includes a first transceiver 12 that is in communication with a second transceiver 14. The transceivers 12, 14 transmit radio blocks of data to each other. Each of the radio blocks of data may include a header and a payload. An example radio block of data is shown in FIG. 5.

The transceivers 12, 14 respond to the reception of radio blocks of data with the generation of ACK/NACK signals. ACK/NACK signals may be referred to as status signals, which may include dedicated decoding status indicators for respective header and payload portions of a block of data. In accordance with an embodiment of the present disclosure, ACK/NACK signals indicate whether the headers and/or payload redundancy versions were received and successfully decoded. Conventionally, ACK/NACK signals were provided and used only with respect to receipt acknowledgement of payload information. By providing a header ACK/NACK signal, which may be an example of a dedicated indicator, the first transceiver 12 is able to determine whether a header has been decoded successfully by the second transceiver 14. The first transceiver 12 may transmit redundancy versions, as well as associated header information, to the second transceiver 14 based on the header ACK/NACK signal, thereby improving decoding performance.

The first transceiver 12 includes a first control module 20, which is in communication with a first transmitter 22 and a first receiver 24. The first control module 20 includes a first ACK/NACK evaluation and generation module 26. The second transceiver 14 includes a second control module 28, which is in communication with a second transmitter 30 and a second receiver 32. The second control module 28 includes a second ACK/NACK evaluation and generation module 33. The ACK/NACK evaluation and generation modules 26, 33 may receive, generate, and/or evaluate header and payload ACK/NACK signals. The header and payload ACK/NACK signals may include a header ACK/NACK signal, a payload ACK/NACK signal, and/or a combined header and payload ACK/NACK signal.

In operation, the first control module 20 transmits a first header and a first redundancy version (of a first payload) 34 corresponding to a first radio data block to the second transceiver 14 via the first transmitter 22 and a first antenna 36. The second transceiver 14 receives the header and first redundancy version via a second antenna 38. The second control module 28 generates a header and payload ACK/NACK (header/payload ACK/NACK) signal 40 via the ACK/NACK evaluation and generation module 33 and based on the header and first redundancy version.

The second transceiver 14 transmits the header/payload ACK/NACK signal 40 to the first transceiver 12. The first transceiver 12 may generate and transmit a second redundancy version 42 of the first payload based on the header/payload ACK/NACK signal 40. For example only, when the header and/or the first redundancy version has not been decoded correctly by the second transceiver, the header/payload ACK/NACK signal 40 indicates improper decoding. As a result of improper decoding, the first transceiver 12 transmits a second radio block of data that includes another redundancy version of the first payload. The second radio block of data has a new header, which may include some of the information included in the first header, such as information pertaining to the first payload. The information may include, for example, the same BSN for the first payload.

Figure 2:
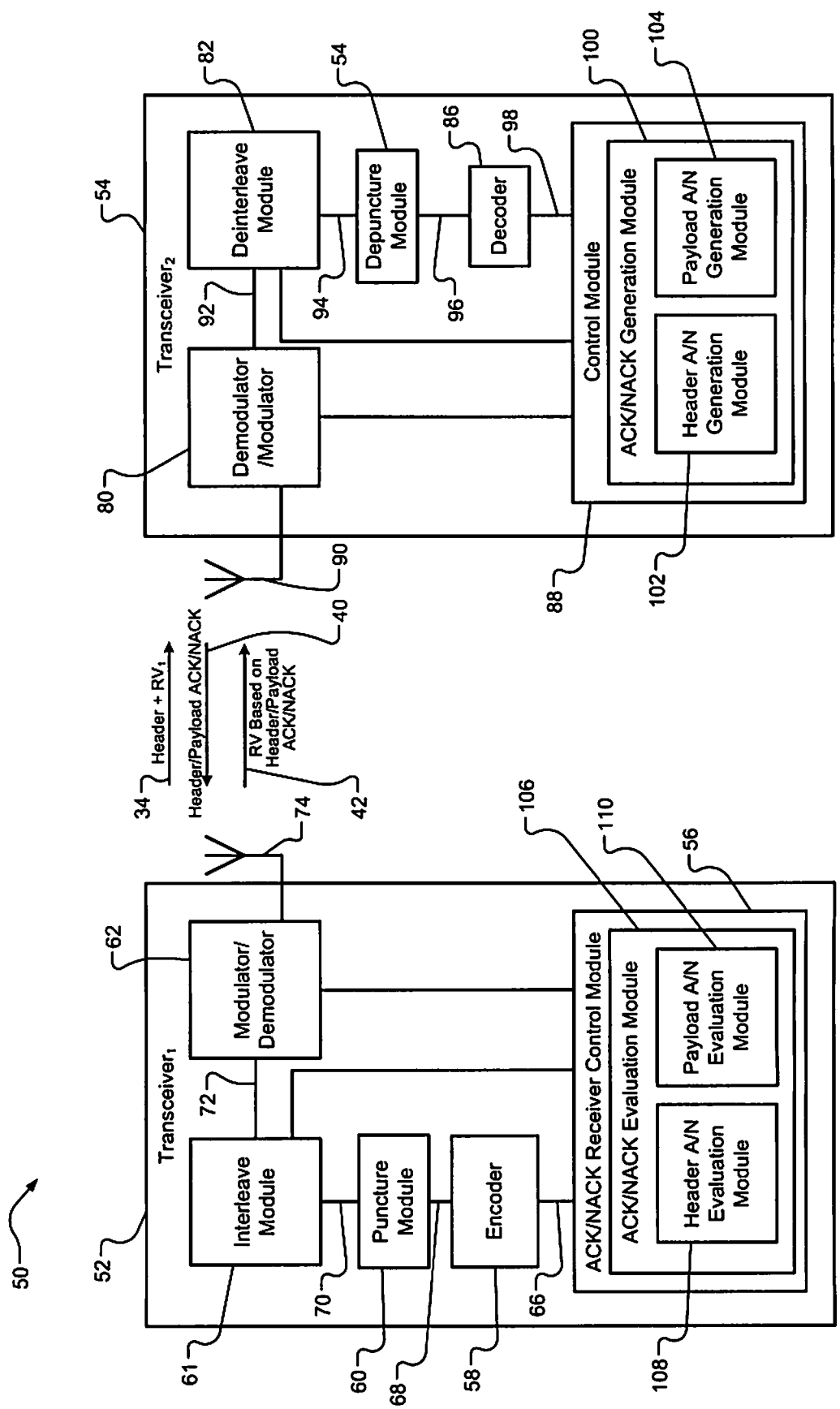
FIG. 2 is a functional block diagram of a mobile communication system in accordance with another embodiment of the present disclosure.

Referring now also to FIG. 2, a functional block diagram of a mobile communication system 50 in accordance with another embodiment of the present disclosure is shown. The mobile communication system 50 includes first and second transceivers 52, 54. The first transceiver 52 is shown and primarily described as a transmitter. The second transceiver 54 is shown and primarily described as a receiver for simplicity reasons. Each of the transceivers 52, 54 may include similar devices and perform similar functions as the other transceiver.

The first transceiver 52 includes an ACK/NACK receiver control module (first control module) 56, an encoder 58, a puncture module 60, an interleave module 61 and a modulator/demodulator 62. The first control module 56 communicates with the encoder 58, the puncture module 60, the interleave module 61 and the modulator 62. The first control module 56 generates blocks of data, which may be provided to the encoder as a source signal 66. The encoder 58 encodes the blocks of data to generate encoded signals 68. The encoder 58 may encode the blocks of data based on an error-correction code and introduce parity bits. The encoded signals 68 may include multiple sets of encoded signals, depending upon the number of encoding devices included in the encoder 58. The encoded signals 68 may be provided to the puncture module 60.

The puncture module 60 may remove a portion of the bits from the encoded signals 68 to reduce the amount of bits transmitted. The puncture module 60 generates punctured signals 70 based on the encoded signals 68. The interleave module receives the punctured signals 70 and generates interleaved signals 72.

The modulator 62 generates radio-frequency modulated signals based on the interleaved signals 72. The radio-frequency modulated signals are transmitted to the second transceiver 14 via a first antenna 74. For example only, the first transceiver 52 may transmit the header and first redundancy version 34, receive the header/payload ACK/NACK signal 40 and transmit the second radio block of data signal 42.

The encoder 58 may be software or firmware based, may be hardware based, or a combination thereof. The encoder 58 and/or the encoding devices thereof may include one or more encoding devices, such as a convolutional encoder, a turbo encoder, a low-density parity check code (LDPC) encoder, etc. and/or a combination thereof. Header blocks may be independently encoded from payload blocks to ensure header protection. In one embodiment, the encoder 58 includes a first encoding device and a second encoding device. The first encoding device may be used to encode headers and the second encoding device may be used to encode payloads. The encoding of blocks of data may comply with 3GPP TS 43.064.

In another embodiment, the first encoding device performs as a convolution encoder and the second encoding device performs as a convolutional encoder and/or a turbo encoder. The stated embodiments are for example purposes only, other encoding devices may be used. Examples of a convolutional encoder and a turbo-encoder are provided in FIG. 3. An example of a turbo-encoder is provided in FIG. 4. A turbo-encoder may perform systematic coding with recursive and systematic convolutional codes. Parity bits may be provided by different constituent encoders using different constituent polynomials. The corresponding decoding may be carried out iteratively in order to obtain good error correction performance.

The second transceiver 54 includes a demodulator/modulator 80, a deinterleave module 82, a depuncture module 84, a decoder 86 and a second control module 88. The demodulator/modulator 80 receives the radio-frequency modulated signals from the first transceiver 52 via a second antenna 90. The demodulator/modulator 80 demodulates the radio-frequency modulated signals, which include header and payload information to generate demodulated signals 92. The deinterleave module 82 receives the demodulated signals 92 and generates deinterleaved signals 94. The depuncture module 84 depunctures the deinterleaved signals to generate depunctured signals 96. The decoder 86 decodes the depunctured signals 96 to generate decoded signals 98, which are received by the second control module 88.

In one example embodiment, the demodulator/modulator 80 separates the demodulated signals 92 into header signals and redundancy versions. The header signals and redundancy versions may be provided to deinterleave module 82, followed by the depuncture module 84 and the decoder 86.

Continuing from the same embodiment, the decoder 86 receives deinterleaved and depunctured header signals and redundancy versions. The decoder 86 may include multiple decoding devices. A first decoding device may decode the header signals and the second decoding device may decode the redundancy versions. For example only, the first decoding device may be a convolutional decoding device and the second decoding device may be a convolutional and/or turbo-decoding device. The decoder 86 may include shift registers, Viterbi decoding devices, multiplexers, etc.

The decoder 86 generates decoded header signals and redundancy versions, which may include the header and payload data originally transmitted. The header signals, the redundancy versions and/or other decoded information may also include cyclic redundancy check bits, which may be used to determine correctness of the decoding. An example that includes CRC checksum fields with CRC bits is shown in FIG. 5. The second control module 88 in response to the decoded header signals and redundancy versions generates ACK/NACK signals, which may include header ACK/NACK signals, payload ACK/NACK signals, and/or combined header and payload ACK/NACK signals. The ACK/NACK signals are transmitted to the first transceiver 52 via the second antenna 90. Example ACK/NACK signals and bit maps are provided in FIGS. 5-6.

The second control module 88 may include an ACK/NACK generation module 100 that includes a header generation module 102 and a payload generation module 104. The header ACK/NACK generation module 102 generates the header ACK/NACK signals. The payload ACK/NACK generation module 104 generates the payload ACK/NACK signals. The ACK/NACK signals may include block sequence numbers (BSNs) or other suitable designations to indicate which header, payload or data blocks were not decoded successfully.

The first control module 56 receives the ACK/NACK signals via the first antenna 74. The first control module 56 includes an ACK/NACK evaluation module 106 that includes a header ACK/NACK evaluation module 108 and a payload ACK/NACK evaluation module 110. The header evaluation module 108 monitors the header ACK/NACK signals and indicates when a header was not decoded successfully. The payload evaluation module 110 monitors the payload ACK/NACK signals and indicates when a redundancy version was not decoded successfully. The first control module 56 may retransmit a redundancy version of a payload, for example a redundancy version of one or more BSNs, or another redundancy version based on the header and/or payload ACK/NACK signals. The first control module 56 may determine which headers and payloads were not decoded successfully based on BSN information in the ACK/NACK signals 68.

Figure 3:
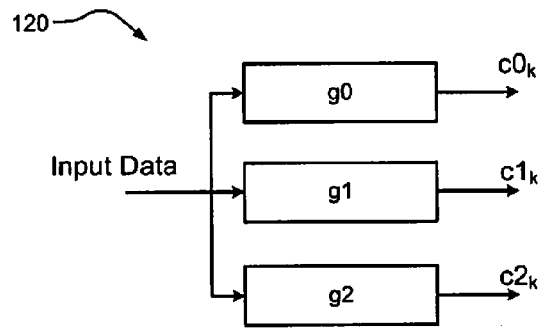
FIG. 3 is an example of a convolutional encoder in accordance with an embodiment of the present disclosure.

Referring now to FIG. 3, an example view of a convolutional encoder 120 in accordance with an embodiment of the present disclosure is shown. The convolutional encoder 120 includes multiple convolutional code word generators g0-g2. For the example shown, the convolutional encoder 120 is a rate R=⅓ parallel encoder. The embodiments disclosed herein may include encoders that encode at other rates. Input data, such as header blocks, is provided to each code word generator g0-g2. The code word generators g0-g2 respectively generate code words $c0_k$, $c1_k$ and $c2_k$, where 0, 1, 2 identify the code word generator and k is an integer number of the bits per code word. A coded data stream may be c00, c01, c02, c10, c11, c12, . . . , where there are three bits per information bit.

Figure 4:
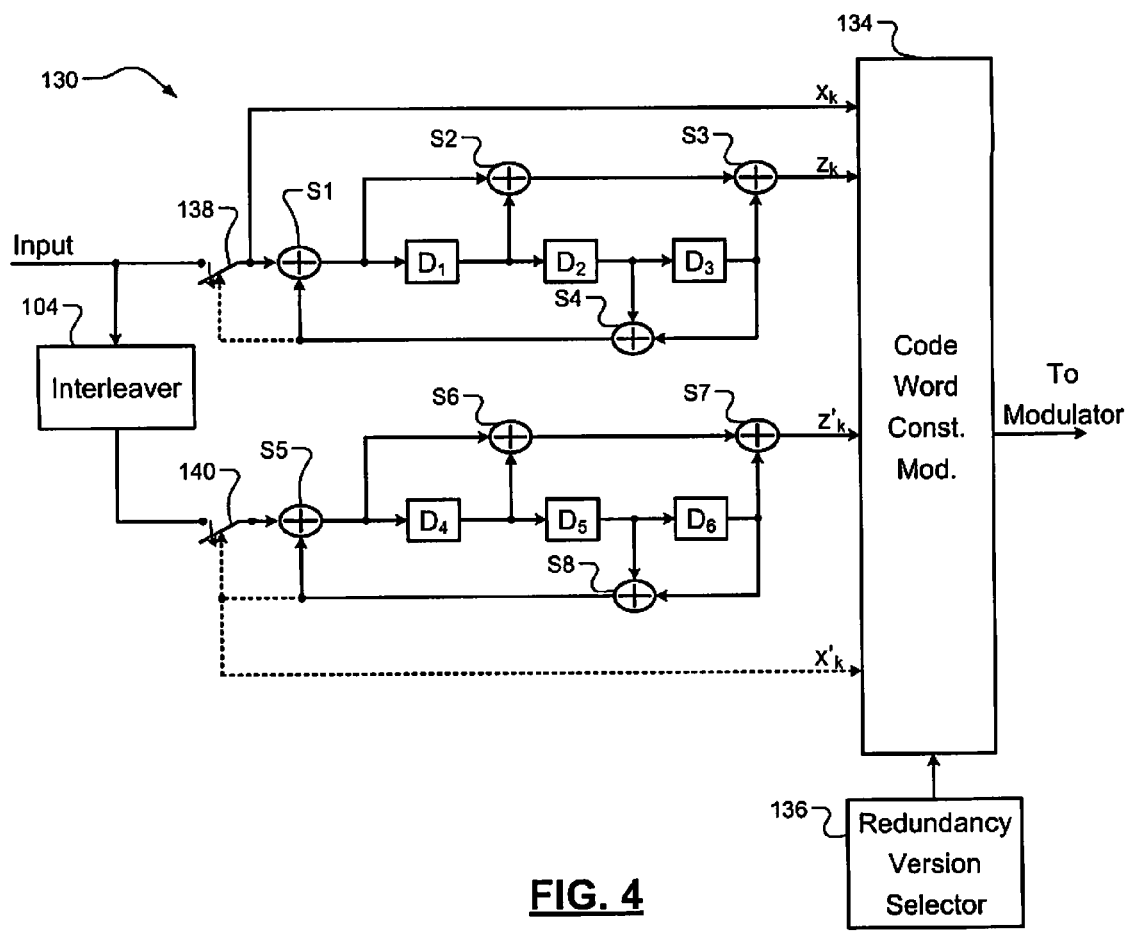
FIG. 4 is an example of a turbo-encoder in accordance with an embodiment of the present disclosure.

Referring now to FIG. 4, an example view of a turbo-encoder 130 in accordance with an embodiment of the present disclosure is shown. The turbo-encoder 130 includes a first set of delays $D_1$-$D_3$, a turbo-code interleaver 132, a second set of delays $D_4$-$D_6$, a code word construction module 134, a redundancy version selector 136, and summers S1-S8. Input data $x_k$, such as payload data, is provided to the first set of delays $D_1$-$D_3$, to the turbo-code interleaver 132, and to the code word construction module 134 as systematic bits in the order in which they are received.

A first switch 138 may permit passage of the input data to the first set of delays $D_1$-$D_3$, which are connected in series. The input data $x_k$ is provided to the summer S1 that is connected between the first switch 138 and the first set of delays $D_1$-$D_3$. The summer S1 sums the input data $x_k$ with the output of the summer S4. Output of the summer S1 is provided to the first delay $D_1$ and to the summer S2. Output of the first delay $D_1$ is provided to the second delay $D_2$ and to the summer S2. Output of the summer S2 is provided to the summer S3.

Output of the second delay $D_2$ is provided to the third delay $D_3$ and to the summer S4. Output of the third delay $D_3$ is provided to the summer S3 and to the summer S4. The summer S3 sums the outputs of the summer S2 and the third delay $D_3$ to generate first set of parity bits $z_k$. The output of the summer S4 is provided to the summer S1 and may activate the first switch 128.

An interleaved output of the turbo-code is provided at interleaver 132 to the second set of delays $D_{4\text{-}6}$. The second set of delays $D_{4\text{-}6}$ may receive the interleaved output based on state of a second switch 140. The delays $D_{4\text{-}6}$ are connected in series.

The interleaved output is provided to the summer S5 that is connected between the second switch 140 and the second set of delays $D_{4\text{-}6}$. The summer S5 sums the interleaved output with the output of the summer S8. Output of the summer S5 is provided to the fourth delay $D_4$ and to the summer S6. Output of the fourth delay $D_4$ is provided to the fifth delay $D_5$ and to the summer S6. Output of the summer S6 is provided to the summer S7.

Output of the fifth delay $D_5$ is provided to the sixth delay $D_6$ and to the summer S8. Output of the sixth delay $D_6$ is provided to the summer S7 and to the eighth summer S8. The summer S7 sums the outputs of the summer S6 and the sixth delay $D_6$ to generate second set of parity bits $z'_k$. The output of the summer S8 is provided to the summer S5 and may be provided to activate the second switch 140.

The parity bits $z_k$, $z'_k$ are provided to the code word construction module 134. The code word construction module 134 generates code words based on the systematic bits, the parity bits $z_k$, $z'_k$ and a redundancy selection signal from the redundancy version selector 136. The redundancy version selector 136 may be part of the first control module 56 or the encoder 58 of FIG. 2. The code word construction module 134 may perform bit mapping and/or interleaving when generating code words.

A redundancy version refers to a subsequently transmitted code word or block of data that is altered from an original code word or block of data. As an example a first code word or block of data may include systematic bits $x_1$, $x_2$, $x_3$, $x_4$. A first redundancy version may include one or more of the systematic bits $x_1$, $x_2$, $x_3$, $x_4$ and/or one or more parity bits. The parity bits are generated based on the input data or systematic bits $x_1$, $x_2$, $x_3$, $x_4$. In one embodiment, when transmitting at a high rate, puncturing to increase a mother code rate R (for example from ⅓ to 1), the first block of data or version may primarily include systematic bits. Subsequent redundancy versions may primarily include parity bits. For the example provided, the total number of coded bits generated from L input bits may be equal to 3L+b, where L and b are integer values.

Referring now to FIG. 5, a diagram illustrating a radio block 150 in accordance with an embodiment of the present disclosure is shown. The radio block 150 is provided as an example of a block of data that may be generated by the control modules 12, 14, 56, 88 of FIGS. 1 and 2. The radio block 150 may include a header 152 and redundancy versions $RVBSN_1$, $RVBSN_2$ ... with corresponding header and redundancy version CRC bits HeaderCRC, $RVBSN_1$ CRC, $RVBSN_2$ CRC, ....

The header 152 may include block sequence information identifying the corresponding redundancy versions for a current radio block of data that has one or more corresponding BSNs. The header 152 may also include the length of the corresponding block of data, code rate of the corresponding block of data, etc. The redundancy versions may include, for example, user information. The header 152 provides information about the blocks of data, such as the structures of the blocks of data and/or the layouts of the bits thereof or other suitable information as may be required by communication protocols. The payload blocks include the actual material information being transmitted between users or communication devices.

Referring now to Table 1 for an example of encoded transmission of a radio block and passed reception of a header (Hdr) and 2 of 3 first redundancy versions corresponding to BSN_A, BSN_B, and BSN_C. BSN_A, BSN_B, and BSN_C correspond to respective payload blocks. The radio block may for example be transmitted from a first transceiver, such as a base station, as a downlink signal to a second transceiver. The second transceiver may be for example a cellular phone. The header is transmitted and decoded successfully. The first payload block corresponding to BSN_A is transmitted and is not decoded successfully. The second and third payload blocks corresponding to BSN_B and BSN_C are transmitted and decoded successfully. The radio block may refer to transmitted bursts of a MCS block.

TABLE 1

Header and Payload ACK/NACK Reporting with Header Passing on First Transmission

| Direction | Header | BSN_A | BSN_B | BSN_C | Remarks |
|---|---|---|---|---|---|
| Downlink | Hdr Pass | TX: RV1 At RX: Data Fail | TX: RV1 At RX: Data Pass No further action | TX: RV1 At RX: Data Pass No further action | |
| Uplink | | | | | Report: BSN_A fail, Hdr BSN_A Pass |
| Downlink | Hdr Pass | TX: RV2 | N/A | N/A | Transmitted with other BSNs |
| Uplink | | | | | Report: BSN_A pass |

The second transceiver sends an uplink signal reporting decoding passage of the header and second and third payload blocks, as well as decoding failure of first payload block. The first transceiver generates a second downlink signal with a new header and a second redundancy version for the first payload block. A second uplink signal is generated reporting to the first transceiver that the second redundancy version was decoded successfully.

Similar encoded transmission and reporting of header and payload decoding status may apply when the first transceiver is a cellular phone and the second transceiver is a base station. The encoded transmission and reporting may be used between communications devices other than a cellular phone and a base station.

Referring now to Table 2 an example of encoded transmission of a radio block and failed reception of a header (Hdr') and first redundancy versions corresponding to BSN_A', BSN_B', and BSN_C'. Each of the redundancy versions may be retransmitted, retransmitted together, retransmitted separately with other redundancy versions for other payload blocks, etc. In the example shown, the header of this transmission is transmitted but not decoded successfully. Therefore, the payload blocks corresponding to BSN_A', BSN_B' and BSN_C' are transmitted and not decoded successfully. The second transceiver sends an uplink signal reporting decoding failure of the header and the payload blocks. The first transceiver generates a second downlink signal with a new header and a redundancy version of BSN_A' is retransmitted, not necessarily with redundancy versions for the second and third payload blocks. The redundancy version may be the same as the first transmission of BSN_A'.

TABLE 2

Header and Payload ACK/NACK Reporting with Header and Payload Blocks not Passing for First Transmission

| Direction | Header | BSN_A' | BSN_B' | BSN_C' | Remarks |
|---|---|---|---|---|---|
| Downlink | Hdr' Fail | TX: RV1 At RX: Data Fail | TX: RV1 At RX: Data Fail | TX: RV1 At RX: Data Fail | |
| Uplink | | | | | Report: Data BSN_A' fail, Hdr BSN_A' fail Data BSN_B' fail, Hdr BSN_B' fail Data BSN_C' fail, Hdr BSN_C' fail |
| Downlink | Hdr' Pass | TX: RV1 At RX: Data Pass | | | Transmitted with other BSNs |
| Uplink | | | | | Report: BSN_A pass |

Referring now to Table 3 for an example of encoded transmission of a radio block and failed reception of a header and first redundancy versions corresponding to BSN_A", BSN_B", and BSN_C". For this example, during a first transmission and reception cycle, header decoding failed and no systematic bits are available for BSN_A", BSN_B", and BSN_C". Systematic bits were transmitted during the first transmission. During the next two transmission and reception cycles, although Table 3 shows transmission and reception of other redundancy versions for BSN_A" without systematic bits, transmission and reception of other redundancy versions for BSN_B" and BSN_C" may also be performed. Successful decoding does not occur until retransmission of the first redundancy version for BSN_A", BSN_B", and BSN_C".

TABLE 3

Header and Payload ACK/NACK Reporting with Header and Payload Blocks not Passing for First Transmission and First Transmission includes Systematic Bits

| Direction | Header | BSN_A" | BSN_B" | BSN_C" | Remarks |
|---|---|---|---|---|---|
| Downlink | Hdr Fail | TX: RV1 At RX: Data Fail | TX: RV1 At RX: Data Fail | TX: RV1 At RX: Data Fail | |
| Uplink | | | | | Report: Data BSN_A fail, Data BSN_B fail, Data BSN_C fail |
| Downlink | Hdr Pass | TX: RV2 At RX: Data Fail | | | Transmitted with other BSNs. Payload Block 1 not decoded as RV1 (with systematic bits) is missing. |

TABLE 3-continued

Header and Payload ACK/NACK Reporting with Header and Payload Blocks not Passing for First Transmission and First Transmission includes Systematic Bits

| Direction | Header | BSN_A" | BSN_B" | BSN_C" | Remarks |
|---|---|---|---|---|---|
| Uplink | | | | | Report: BSN_A fail |
| Downlink | Hdr Pass | TX: RV3 | | | Transmitted with other |
| | | At RX: | | | BSNs. Payload Block 1 |
| | | Data Fail | | | not decoded as RV1 (with systematic bits) is missing. |
| Uplink | | | | | Report: BSN_A fail |
| Downlink | Hdr Pass | TX: RV1 | | | Transmitted with other |
| | | At RX: | | | BSNs. |
| | | Data Pass | | | Now can decode Payload Block 1 as the systematic bits are available. |
| Uplink | | | | | Report: BSN_A pass |

Table 3 provides an example of prioritization of systematic bits. Subsequent redundancy versions corresponding to a payload block may be selected based on unsuccessful decoding of a header in various circumstances. Redundancy version selection may be performed when there is a failure or performance degradation in an encoding/decoding process. The failure may be due to a loss in a majority of systematic bits, due to degraded decoding of a redundancy version, etc. The explicit and dedicated indication of header decoding status allows for subsequent adjustment in encoded transmissions for improved overall performance.

Figure 6:
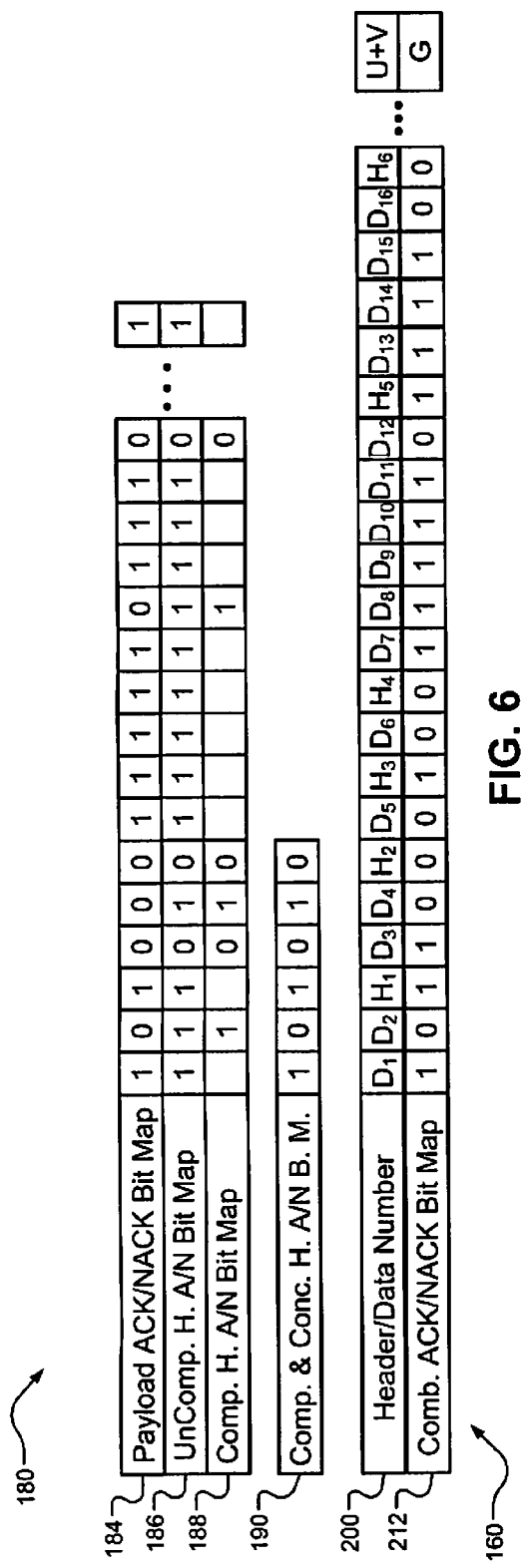
FIG. 6 is a diagram of bit maps in accordance with an embodiment of the present disclosure.
Figure 7:
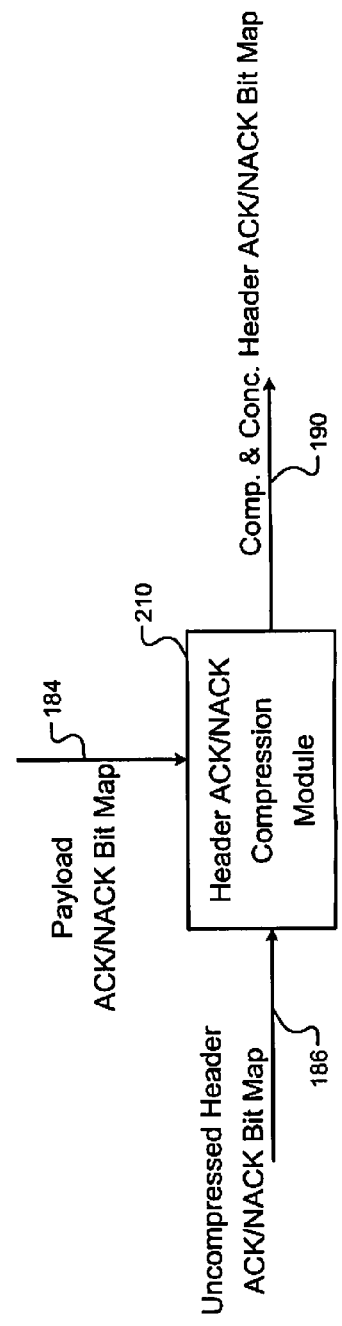
FIG. 7 is a functional block diagram of a header compression module in accordance with an embodiment of the present disclosure.

Referring now to FIGS. 6 and 7, a compressed and concatenated header ACK/NACK bit map 190, a combined header/data bit map 212, and a header compression module 210 in accordance with an embodiment of the present disclosure are shown. A payload ACK/NACK bit map 184, an uncompressed ACK/NACK bit map 186, and a compressed header ACK/NACK bit map 188 are shown.

The payload ACK/NACK bit map 184 includes BSN status values for each BSN transmitted. The uncompressed header ACK/NACK bit map 186 includes header status values corresponding to each BSN. The compressed header ACK/NACK bit map 188 includes header status values corresponding to negative BSN status values. The negative BSN status values are shown as having a value of zero (0), which indicates that the corresponding BSN was not decoded by the receiver.

The header compression module 210 may provide the compressed and concatenated header ACK/NACK bit map 190 based on the payload ACK/NACK bit map 184 and the uncompressed ACK/NACK bit map 186. This provides a method of decreasing the size of ACK/NACK signals. The compressed and concatenated header ACK/NACK bit map 190 may have a length that is equal to the number of payload block failures or negative redundancy version status values. The payload ACK/NACK bit map 184 may be combined with the compressed and concatenated header ACK/NACK bit map 190 to generate a combined ACK/NACK bit map. An example of a combined ACK/NACK bit map 212 is provided and has corresponding payload and header identification numbers $D_1$-$D_{16}$ and $H_1$-$H_6$, which may be part of a header/data bit map 200. Each of the header numbers $H_1$-$H_6$ may correspond to one or more of the payload numbers $D_1$-$D_{16}$.

The header/data bit map 200 includes header/data values 214, which identifies the header and redundancy versions, and the combined ACK/NACK bit map 212. The values of the compressed and concatenated header ACK/NACK bit map 190 may be provided as a separate header ACK/NACK signal or may be interleaved with the payload ACK/NACK bit map 184. Each of the compressed and concatenated header ACK/NACK bit map values may be inserted after the corresponding negative payload block status values, as shown.

For the example embodiment shown, the number of values in the combined ACK/NACK bit map G is equal to the number of payload ACK/NACK bit map values M plus the number of compressed and concatenated header ACK/NACK bit map values V. V is an integer value. The combined ACK/NACK bit map 212 may be transmitted as a combined ACK/NACK signal.

Figure 8:
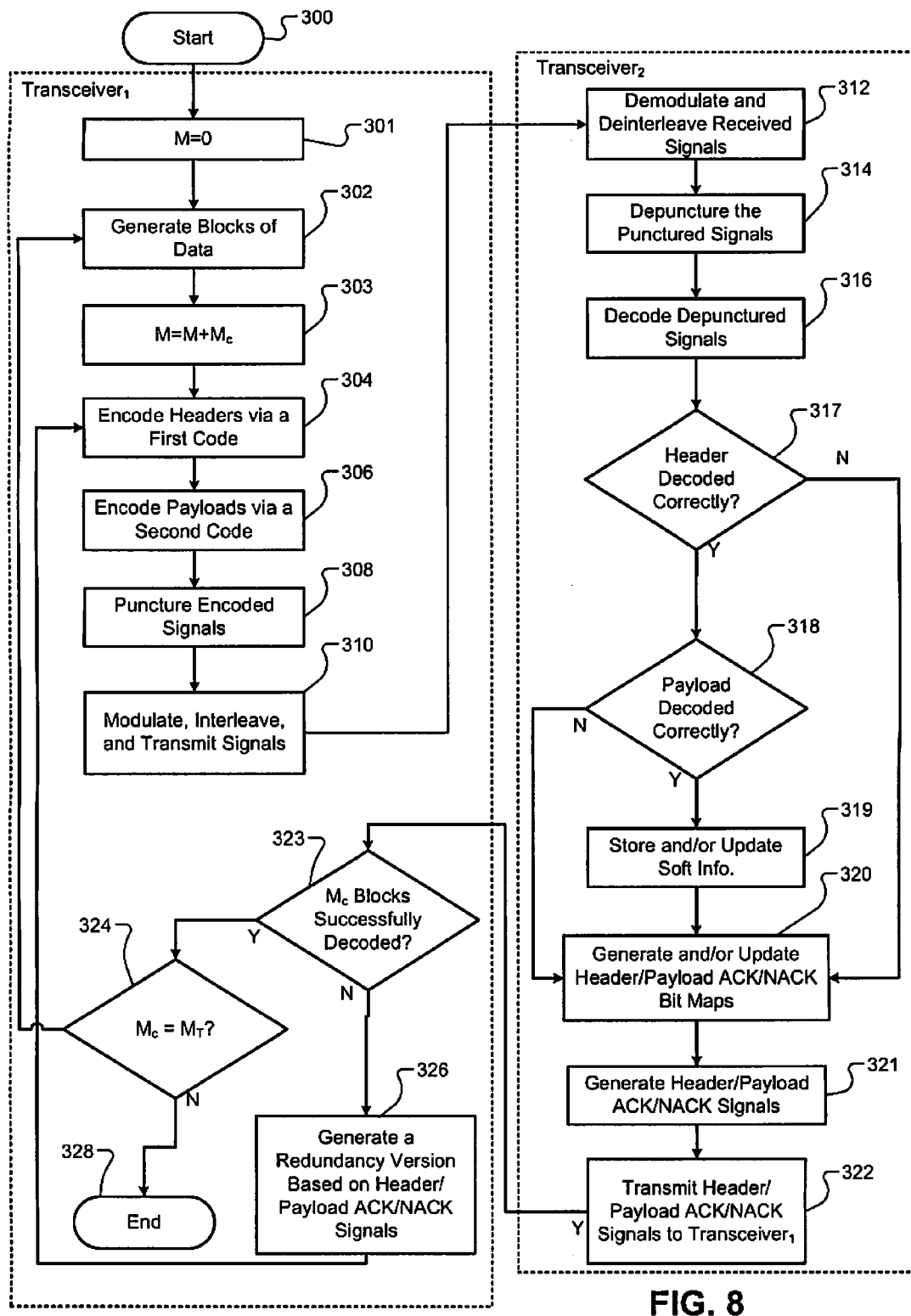
FIG. 8 is logic flow diagram illustrating a method of operating transceivers of a communication system in accordance with an embodiment of the present disclosure.

Referring now to FIG. 8, a logic flow diagram illustrating a method of operating transceivers of a communication system. The method may begin at step 300. In step 301, a counter may be initialized. A data block counter M may be set equal to 0.

In step 302, a first transceiver generates one or more blocks of data that each includes a header and one or more payload blocks. In step 303, the counter M may be incremented by the number of blocks of data currently being generated and transmitted $M_c$. The value of $M_c$ may be reset and updated for each additional set of blocks of data.

In step 304, the first transceiver may encode the current header to generate encoded header signal. In step 306, the first transceiver encodes the current payload blocks to generate encoded payload signals (a redundancy version for each payload block) having corresponding BSNs.

In step 308, the first transceiver punctures the encoded header and payload signals to generate punctured signals. The generated puncture sequence may be the same or different than a previous iteration. For example, the same or a different puncture sequence may be used for redundancy versions corresponding to the same payload block. In step 310, the first transceiver may interleave and/or modulate and transmit the punctured signals to a second transceiver.

In step 312, the second transceiver may demodulate, deinterleave and/or separate header and payload portions of the transmitted signals. In step 314, the second transceiver depunctures the punctured signals to generate depunctured signals. In step 316, the second transceiver decodes the depunctured signals. A first decoder, such as a convolutional decoder, may decode header portions of the depunctured signals. A second decoder, such as a turbo-decoder, may decode payload portions of the depunctured signals to generate decoded header and payload signals. The second decoder may utilize soft information stored in a previous iteration when decoding payload data associated with a current iteration.

In step 317, when a header associated with a BSN is decoded correctly the second transceiver proceeds to step 318, otherwise the second transceiver proceeds to step 320. In step 318, when a redundancy version of the corresponding header and BSN of step 317 is not decoded correctly, the second transceiver may proceed to step 319, otherwise may proceed to step 320.

In step 319, the control module of the second transceiver, when a BSN is not decoded correctly, may store and/or update soft information associated with that payload. The soft information may include bits or symbols of partially or incorrectly decoded data, log likelihood ratios (LLRs), etc. When systematic bits are transmitted during a first iteration and the first iteration fails, the header and redundancy versions are not decoded, step 319 may not be performed and the soft information is not updated. As an alternative, the soft information may include place holders or blanks for the associated header and payload information.

The following steps provide a technique for the reporting of when header and redundancy version data are not decoded. The technique includes the generation of header and payload ACK/NACK signals that indicate when a header and/or a payload has not been decoded or decoded correctly, as opposed to just indicating when a source block of data has not been decoded correctly. This improves the available knowledge regarding soft information for bits received at the remote device so that selection of subsequent RVs can be optimized, and thereby this improves throughput and efficiency of the communication system.

In step 320, the second transceiver generates and/or updates stored ACK/NACK bit maps including header and payload ACK/NACK bit maps. In step 321, the second transceiver generates one or more ACK/NACK signals, which may include a header ACK/NACK signal, a payload ACK/NACK signal, and/or a combined ACK/NACK signal. The ACK/NACK signals are generated based on the stored ACK/NACK bit maps.

In step 322, the ACK/NACK signals are transmitted to the first or originating transceiver. In step 323, when the current data blocks $M_c$ including corresponding headers and payloads have been successfully transmitted, received, and decoded the first transceiver may proceed to step 324. When one or more headers and/or payloads have not been successfully decoded by the first transceiver, the second transceiver may proceed to step 326.

In step 324, when the counter M is equal to a total number of blocks of data to be transmitted $M_T$, the first transceiver may proceed to step 328 and end, otherwise the first transceiver may return to step 302 to generate a next set of blocks of data to be transmitted. In step 326, the first transceiver generates a redundancy version of the first or original block of data generated in step 302 and returns to step 304.

The above-described steps are meant to be illustrative examples; the steps may be performed sequentially, synchronously, simultaneously, continuously, during overlapping time periods or in a different order depending upon the application.

The embodiments described herein provide header and payload transmission success indication, which may improve performance in communication system that have MCSs with high code rates and/or operate in different signal-to-noise and/or interference environments.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A transceiver comprising:
   a receiver configured to receive and demodulate a first encoded block of data that includes a first redundancy version corresponding to a first payload portion and a first header portion,
   wherein the first encoded block of data is received from a communication device that is remote from the transceiver and that is in a cellular telecommunication network, and
   a transmitter configured to transmit an acknowledgement (ACK) signal and a negative acknowledgement (NACK) signal, wherein the NACK signal includes a dedicated decoding status indicator for the first header portion to indicate when the first header portion has not been decoded properly.

2. The transceiver of claim 1 wherein the receiver is configured to receive and demodulate the first encoded block of data when encoded based on at least one of convolutional encoding, turbo encoding, and low-density parity-check encoding.

3. The transceiver of claim 1 further comprising a control module configured to control reception and demodulation of a second encoded block of data that includes a second header portion and a second redundancy version corresponding to the first payload portion via the receiver,
   wherein the second redundancy version is generated at least partially based on at least one of the ACK signal and the NACK signal.

4. The transceiver of claim 3 wherein the second header portion is different than the first header portion.

5. The transceiver of claim 3 wherein at least one of the ACK signal and the NACK signal includes a decoding status indicator of the first payload portion, and
   wherein the control module is configured to control reception and demodulation of the second encoded block of data, and
   wherein the second encoded block of data is generated at least partially based on a decoding status of the first payload portion and the first header portion.

6. The transceiver of claim 3 wherein:
   the first redundancy version includes bits; and
   the second redundancy version includes the bits in the first redundancy version.

7. The transceiver of claim 3 wherein the second redundancy version includes different bits than the first redundancy version.

8. The transceiver of claim 3 wherein the receiver is configured to demodulate the first payload portion using bits of the first redundancy version and additional bits of the second redundancy version that are selected based on at least one of the ACK signal and the NACK signal.

9. The transceiver of claim 3 wherein the first redundancy version includes systematic bits and the second redundancy version include parity bits.

10. The transceiver of claim 9 wherein the first redundancy version does not include parity bits and the second redundancy version does not include systematic bits.

11. A mobile station that includes the transceiver of claim 1.

12. A base station that includes the transceiver of claim 1.

13. A network that includes the transceiver and communication device of claim 1.

14. A transceiver comprising:
a transmitter configured to modulate and transmit an encoded first block of data that includes a first redundancy version corresponding to a first payload portion and a first header portion to a communication device that is remote from the transceiver and in a cellular telecommunication network; and
a receiver configured to receive an acknowledgement (ACK) signal and a negative acknowledgement (NACK) signal, wherein the NACK signal includes a dedicated decoding status indicator to indicate when the first header portion has not been decoded properly by the communication device.

15. The transceiver of claim 14 further comprising a control module configured to control modulation and transmission of an encoded second block of data that includes a second header portion and a second redundancy version corresponding to the first payload portion via the transmitter,
wherein the second redundancy version is generated at least partially based on at least one of the ACK signal and the NACK signal.

16. The transceiver of claim 15 wherein the second header portion is different than the first header portion.

17. The transceiver of claim 14 wherein at least one of the ACK signal and the NACK signal includes a decoding status indicator of the first payload portion, and
wherein the encoded second block of data is at least partially based on a decoding status of the first payload portion and the first header portion.

18. The transceiver of claim 15 wherein:
the transmitter is configured to modulate and transmit the second redundancy version;
the first redundancy version includes bits; and
the second redundancy version includes the bits in the first redundancy version.

19. The transceiver of claim 15 wherein the transmitter is configured to modulate and transmit the second redundancy version, and
wherein the second redundancy version includes different bits than the first redundancy version.

20. The transceiver of claim 15 wherein the transmitter is configured to modulate and transmit the second redundancy version, and
wherein bits of the second redundancy version are selected based on at least one of convolutional encoding, turbo encoding, and low-density parity-check encoding.

21. The transceiver of claim 15 wherein the transmitter is configured to modulate and transmit the first redundancy version, which includes systematic bits, and
wherein the second redundancy version include parity bits.

22. The transceiver of claim 15 wherein the transmitter is configured to modulate and transmit the first redundancy version, which does not include parity bits, and
wherein the second redundancy version does not include systematic bits.

23. The transceiver of claim 14 wherein the transmitter is configured to modulate and transmit the first encoded block of data that is encoded based on at least one of convolutional encoding, turbo encoding, and low-density parity-check encoding.

24. A mobile station that includes the transceiver of claim 14.

25. A base station that includes the transceiver of claim 14.

26. A network that includes the transceiver and communication device of claim 14.

27. A transceiver comprising:
a demodulator configured to generate a demodulated signal based on an encoded block of data that includes a header portion and a payload portion and that is received from a communication device that is remote from the transceiver and in a cellular telecommunication network;
a decoder configured to generate a decoded signal based on the demodulated signal; and
a control module configured to control generation and transmission of a header status signal to the communication device at least partially based on decoding of the header portion, wherein the header status signal includes a dedicated decoding status indicator of the header portion, and wherein the dedicated decoding status indicator indicates when the header portion has not been decoded properly.

28. The transceiver of claim 27 wherein the control module is configured to control reception of a redundancy version corresponding to the payload portion from the communication device, and
wherein the redundancy version is generated at the remote device at least partially based on the header status signal.

29. The transceiver of claim 27 wherein the control module is configured to control generation and transmission of a payload status signal based on whether the payload portion is decoded by the decoder.

30. The transceiver of claim 29 wherein the control module is configure to control generation and transmission of an acknowledgement signal that includes the header status signal and the payload status signal to the communication device.

31. The transceiver of claim 30 wherein the control module is configured to control generation and transmission of the acknowledgement signal including a concatenation of a header bit map and a payload bit map.

32. The transceiver of claim 30 wherein the control module is configured to control generation of a bit map that indicates a decoding status for each of a plurality of payload blocks, and
wherein the control module is configured to control generation of the acknowledgement signal based on the header status signal and the bit map.

33. The transceiver of claim 27 wherein the control module is configured to control generation of a header bit map that indicates a decoding status for each header of a plurality of blocks of data,
wherein the control module is configured to control generation of a payload bit map that indicates a decoding status for each payload of the plurality of blocks of data; and
wherein the control module is configured to control generation of the header status signal and a payload status signal based respectively on the header bit map and the payload bit map.

34. The transceiver of claim 33 wherein the control module is configured to compress the header bit map based on the payload bit map.

35. The transceiver of claim 34 wherein a first number of bits in the header bit map is equal to a second number of bits in the payload bit map that represent a non-decoded payload block.

36. The transceiver of claim 35 wherein the control module is configured to control generation and transmission of an acknowledgement signal including a concatenation of the header bit map and the payload bit map.

37. The transceiver of claim 27 wherein the demodulator is configured to generate the demodulated signal based on the encoded block of data, which includes at least one of turbo-encoded data, convolutional encoded data, and low-density parity-check encoded data.

38. A communication system comprising the transceiver of claim 27 and further comprising the communication device, wherein the communication device is configured to generate at least one of a header and a redundancy version corresponding to the payload portion based on the header status signal.

39. A transceiver comprising:
an encoder that is configured to generate an encoded signal based on a block of data that includes a payload portion and a first header portion;
a modulator that is configured to generate a modulated signal based on the encoded signal;
a transmitter that is configured to transmit the modulated signal to a network communication device that is remote from the transceiver and in a cellular telecommunications network; and
a control module that is configured to control reception of a header status signal from the network communication device at least partially based on the modulated signal, wherein the header status signal includes a dedicated decoding status indicator of the first header portion, and wherein the dedicated decoding status indicator indicates when the first header portion has not been decoded properly.

40. The transceiver of claim 39 wherein the header status signal is generated based on whether the first header portion is decoded by the network communication device.

41. The transceiver of claim 39 wherein the control module is configured to at least one of: control transmission of a second encoded header portion that is different than an encoded header portion of the encoded signal and control transmission of a redundancy version of the payload portion to the network communication device based on the header status signal.

42. The transceiver of claim 39 wherein the control module is configured to control reception of a payload status signal indicating a decoding status of the payload by the network communication device, and
wherein the control module is configured to control transmission of a redundancy version of the payload portion to the network communication device based on the payload status signal and the header status signal.

43. The transceiver of claim 42 wherein the control module is configured to control reception of an acknowledgement signal that includes the header status signal and the payload status signal from the network communication device.

44. The transceiver of claim 43 wherein the acknowledgement signal includes a concatenation of a header bit map and a payload bit map.

45. The transceiver of claim 39 wherein the header status signal is generated by the network communication device based on a bit map that indicates a decoding status for each of a plurality of blocks of data that are transmitted from the transceiver to the network communication device.

46. The transceiver of claim 39 further comprising a receiver configured to receive the header status signal and a payload status signal generated by the network communication device based respectively on a header bit map and a payload bit map,
wherein the header bit map indicates a decoding status for a header and plurality of blocks of data, and
wherein the payload bit map indicates a decoding status for each payload of the plurality of blocks of data.

47. The transceiver of claim 46 wherein the header bit map is compressed based on the payload bit map.

48. The transceiver of claim 46 wherein each status bit of the header bit map is generated based on a corresponding payload status bit of the payload bit map.

49. The transceiver of claim 46 wherein a first number of bits in the header bit map is equal to a second number of bits in the payload bit map that represent a non-decoded payload block.

50. The transceiver of claim 49 wherein the control module is configured to control reception of an acknowledgement signal that includes the header bit map and the payload bit map from the network communication device, and
wherein the control module is configured to control generation and transmission of a redundancy version corresponding to the payload portion based on the acknowledgement signal.

51. The transceiver of claim 50 wherein the control module is configured to control reception of the acknowledgement signal including a concatenation of the header bit map and the payload bit map.

52. The transceiver of claim 39 wherein the encoded signal includes at least one of turbo-encoded data, convolutional encoded data, and low-density parity-check encoded data.

53. A communication system comprising the transceiver of claim 39 and further comprising the network communication device,
wherein the communication device is configured to receive at least one of a header and a redundancy version from the transceiver corresponding to the payload portion based on the header status signal.

* * * * *